United States Patent
Azar et al.

(10) Patent No.: US 7,619,639 B1
(45) Date of Patent: Nov. 17, 2009

(54) ADAPTIVE SCALING USING A PROGRAMMABLE VIDEO ENGINE

(75) Inventors: Hassane S. Azar, San Francisco, CA (US); Mihai Sipitca, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 141 days.

(21) Appl. No.: 11/224,892

(22) Filed: Sep. 12, 2005

(51) Int. Cl.
*G09G 5/00* (2006.01)
*G09G 5/06* (2006.01)

(52) U.S. Cl. .................. 345/667; 345/601; 345/547; 345/660; 382/260

(58) Field of Classification Search .............. 345/601, 345/667, 547, 660; 382/260
See application file for complete search history.

(56) References Cited

U.S. PATENT DOCUMENTS

| | | | | |
|---|---|---|---|---|
| 4,665,433 A * | 5/1987 | Hinson et al. | .............. | 348/580 |
| 4,805,129 A * | 2/1989 | David | .............. | 708/300 |
| 5,461,706 A * | 10/1995 | Trow et al. | .............. | 345/585 |
| 5,526,446 A * | 6/1996 | Adelson et al. | .............. | 382/275 |
| 5,583,650 A * | 12/1996 | Lane et al. | .............. | 386/81 |
| 5,619,270 A * | 4/1997 | Demmer | .............. | 348/441 |
| 5,623,344 A * | 4/1997 | Lane et al. | .............. | 386/81 |
| 5,687,275 A * | 11/1997 | Lane et al. | .............. | 386/68 |
| 5,729,649 A * | 3/1998 | Lane et al. | .............. | 386/68 |
| 5,771,317 A * | 6/1998 | Edgar | .............. | 382/260 |
| 5,841,485 A * | 11/1998 | Steinberg | .............. | 348/663 |
| 5,943,099 A * | 8/1999 | Kim | .............. | 348/448 |
| 5,956,741 A * | 9/1999 | Jones | .............. | 711/1 |
| 5,963,273 A * | 10/1999 | Boie et al. | .............. | 348/725 |
| 5,995,145 A * | 11/1999 | Viliesid | .............. | 348/362 |
| 6,023,341 A * | 2/2000 | Colak | .............. | 356/435 |
| 6,034,733 A * | 3/2000 | Balram et al. | .............. | 348/448 |
| 6,177,894 B1 * | 1/2001 | Yamaguchi | .............. | 341/120 |
| 6,424,749 B1 * | 7/2002 | Zhu et al. | .............. | 382/260 |
| 6,482,160 B1 * | 11/2002 | Stergiopoulos et al. | .............. | 600/443 |
| 6,539,412 B1 * | 3/2003 | Kim et al. | .............. | 708/400 |
| 6,600,514 B1 * | 7/2003 | Van Asma et al. | .............. | 348/458 |
| 6,614,474 B1 * | 9/2003 | Malkin et al. | .............. | 348/252 |
| 6,719,696 B2 * | 4/2004 | Stergiopoulos et al. | .............. | 600/443 |
| 6,754,397 B1 * | 6/2004 | Westerman | .............. | 382/260 |
| 6,766,056 B1 * | 7/2004 | Huang et al. | .............. | 382/190 |
| 6,796,944 B2 * | 9/2004 | Hall | .............. | 600/443 |
| 6,819,453 B1 * | 11/2004 | Suzuki et al. | .............. | 358/1.9 |
| 6,834,806 B2 * | 12/2004 | Benedetti | .............. | 235/462.25 |
| 6,903,716 B2 * | 6/2005 | Kawabe et al. | .............. | 345/99 |
| 6,928,122 B2 * | 8/2005 | Opas et al. | .............. | 375/296 |

(Continued)

*Primary Examiner*—Javid A Amini
(74) *Attorney, Agent, or Firm*—Patterson & Sheridan, LLP

(57) ABSTRACT

The invention pertains to an adaptive scaling technique. A look-up table of optimized filter coefficients is used to configure a multi-tap filter when scaling a video image. The look-up table reflects the scaling between standardized video source (input) resolutions and video display (output) resolutions. When an actual scaling factor does not correspond to an optimized operating point, a device driver determines which two scaling factors reflected in the look-up table are closest to the actual scaling factor. A set of interpolated filter coefficients for the multi-tap filter is then generated from the optimized filter coefficients associated with the two closest scaling factors. One advantage of the disclosed technique is that scaling operations are performed using filter coefficients interpolated from filter coefficients optimized for two similar scaling operations. Thus, the technique provides more precise filtering relative to prior art designs, resulting in higher-quality scaled video images.

12 Claims, 3 Drawing Sheets

U.S. PATENT DOCUMENTS

| | | | |
|---|---|---|---|
| 6,937,291 B1* | 8/2005 | Gryskiewicz | 348/581 |
| 6,990,246 B1* | 1/2006 | Ferguson | 382/240 |
| 6,990,249 B2* | 1/2006 | Nomura | 382/254 |
| 7,254,277 B2* | 8/2007 | Kempf et al. | 382/260 |
| 7,265,791 B2* | 9/2007 | Song et al. | 348/448 |
| 2002/0056753 A1* | 5/2002 | Benedetti | 235/462.25 |
| 2002/0181799 A1* | 12/2002 | Matsugu et al. | 382/260 |
| 2002/0186783 A1* | 12/2002 | Opas et al. | 375/297 |
| 2003/0065262 A1* | 4/2003 | Stergiopoulos et al. | 600/437 |
| 2003/0169247 A1* | 9/2003 | Kawabe et al. | 345/204 |
| 2003/0216644 A1* | 11/2003 | Hall | 600/437 |
| 2004/0189651 A1* | 9/2004 | Zatz et al. | 345/531 |
| 2004/0221143 A1* | 11/2004 | Wise et al. | 712/300 |
| 2004/0246374 A1* | 12/2004 | Mishima et al. | 348/441 |
| 2004/0257157 A1* | 12/2004 | Sahlman | 330/149 |
| 2005/0024666 A1* | 2/2005 | Ohyama et al. | 358/1.13 |
| 2005/0219188 A1* | 10/2005 | Kawabe et al. | 345/94 |
| 2005/0264693 A1* | 12/2005 | Kondo et al. | 348/458 |
| 2005/0280882 A1* | 12/2005 | Nakano | 358/506 |
| 2006/0072841 A1* | 4/2006 | Terao | 382/240 |
| 2006/0088098 A1* | 4/2006 | Vehvilainen | 375/240.03 |
| 2006/0256339 A1* | 11/2006 | Lowney et al. | 356/432 |
| 2006/0269166 A1* | 11/2006 | Zhong et al. | 382/300 |
| 2007/0002727 A1* | 1/2007 | Stessen et al. | 370/210 |
| 2008/0137871 A1* | 6/2008 | Hanna | 381/23 |

* cited by examiner

|  | Output Resolution 1 | Output Resolution 2 | ••• | Output Resolution m-1 | Output Resolution m |
|---|---|---|---|---|---|
| Input Resolution 1 | $C_1, C_2 ... C_{k-1}, C_k$ | $C_1, C_2 ... C_{k-1}, C_k$ | | $C_1, C_2 ... C_{k-1}, C_k$ | $C_1, C_2 ... C_{k-1}, C_k$ |
| Input Resolution 2 | $C_1, C_2 ... C_{k-1}, C_k$ | $C_1, C_2 ... C_{k-1}, C_k$ | | $C_1, C_2 ... C_{k-1}, C_k$ | $C_1, C_2 ... C_{k-1}, C_k$ |
| ⋮ | | | | | |
| Input Resolution n-1 | $C_1, C_2 ... C_{k-1}, C_k$ | $C_1, C_2 ... C_{k-1}, C_k$ | | $C_1, C_2 ... C_{k-1}, C_k$ | $C_1, C_2 ... C_{k-1}, C_k$ |
| Input Resolution n | $C_1, C_2 ... C_{k-1}, C_k$ | $C_1, C_2 ... C_{k-1}, C_k$ | | $C_1, C_2 ... C_{k-1}, C_k$ | $C_1, C_2 ... C_{k-1}, C_k$ |

Figure 1

ADAPTIVE SCALING USING A PROGRAMMABLE VIDEO ENGINE

BACKGROUND OF THE INVENTION

1. Field of the Invention

Embodiments of the present invention relate generally to the field of computer graphics and more specifically to an adaptive scaling technique that uses a programmable video engine.

2. Description of the Related Art

A video image typically is sampled, digitally filtered, and then scaled before being displayed on a display device at a modified resolution. In the sampling step, the analog video signal is digitally sampled to create a digital representation of the video signal (the "digitized video signal"). As is well known, the sampling operation results in spectral replicas of the frequency domain representation of the digitized video signal at each multiple of the sampling frequency.

As is also well known, scaling a video image from a first resolution to a higher resolution (referred to as "upscaling") adds interpolated information to the digitized video signal and, thus, effectively increases the sampling frequency associated with the digitized video signal. Consequently, the frequency gap between the spectral replicas in the frequency domain representation of the digitized video signal increases. By contrast, scaling a video image from a first resolution to a lower resolution (referred to as "downscaling") removes information from the digitized video signal and, thus, effectively decreases the sampling frequency associated with the digitized video signal. Consequently, the frequency gap between the spectral replicas in the frequency domain representation of the digitized video signal decreases. If the frequency gap between spectral replicas decreases too much when downscaling, the spectral replicas may begin to overlap. Such overlap is problematic because it causes "phantom data" to appear in the frequency domain representation of the actual digitized signal, resulting in aliasing in the displayed video image.

The filtering step removes unwanted frequency data prior to the scaling step. When upscaling, the filtering step attempts to remove the spectral replicas from the frequency data, leaving only the "base-band" (i.e., the frequency representation of the original analog signal). When downscaling, the filtering step attempts to remove the spectral replicas from the frequency data as well as establish a cut off frequency that limits the bandwidth of the frequency representation of the actual digitized signal such that no overlap occurs with a spectral replica when the frequency gap decreases. Limiting the bandwidth in this fashion prevents aliasing.

The shape of a multi-tap filter, which establishes the passband, the transitionband and the rejectionband of the filter, is determined by the filter coefficients. One current filter design employs two sets of filter coefficients. One set of coefficients typically is optimized for upscaling, and the second set of coefficients is optimized for a downscaling scaling factor of 2. If the actual operating point (i.e., the actual scaling factor being used for scaling the video image) falls between the two optimized operating points, then a linear interpolation based on the actual scaling factor is performed between the two sets of optimized scaling coefficients to determine the filter coefficients for the actual operating point.

One drawback to the current approach is that multi-tap filter resulting from the interpolation is far from optimal because the two sets of coefficients are designed for quite different operating points. Moreover, the filter coefficients required for a particular intermediate operating point may not be accurately determined by a linear function of the scaling factor. Suboptimal filtering effects may include excessive attenuation of the passband, suboptimal placement of the cut-off frequency, and reduced attenuation of the rejectionband, resulting in a fuzzy (e.g., having excessive passband attenuation) and/or distorted (e.g., having aliased components) scaled video image.

As the foregoing illustrates, what is needed in the art is a more precise multi-tap filter design that results in less image attenuation and/or aliasing during video image scaling.

SUMMARY OF THE INVENTION

One embodiment of the present invention is a computer-readable medium storing instructions for causing a computer to adaptively configure a multi-tap video filter by performing the steps of determining a video input signal resolution, determining a video output signal resolution, determining an actual scaling factor based on the video input signal resolution and the video output signal resolution, and determining whether the actual scaling factor corresponds to an optimized operating point in a look-up table of filter coefficients.

If the actual scaling factor does not correspond to an optimized operating point, the computer is caused to perform the steps of determining a first scaling factor and a second scaling factor that are closest to the actual scaling factor and selecting a first set of filter coefficients from the look-up table associated with the first scaling factor and a second set of filter coefficients from the look-up table associated with the second scaling factor. The computer also is caused to perform the step of interpolating between the first set of filter coefficients and the second set of coefficients to generate a set of interpolated filter coefficients. The multi-tap filter is configured based on the set of interpolated filter coefficients.

One advantage of the disclosed adaptive filtering technique is that upscaling and downscaling operations are performed using filter coefficients that are either optimized for that specific scaling operation or interpolated from coefficients that are optimized for two similar scaling operations. In the latter case, because the two scaling operations are similar, the filter coefficients for intermediate operating points vary in a much more linear fashion as a function of the scaling factor. A linear interpolation of the two sets of optimized filter coefficients based on the actual scaling factor therefore results in filter coefficients better suited for the intermediate operating point than the filter coefficients resulting from the current approach. Thus, the adaptive scaling technique provides more precise filtering relative to prior art designs, resulting in higher-quality scaled video images with less fuzziness and distortion. Further, when downscaling, the disclosed technique implements a set of filter coefficients that provides a cutoff frequency more closely matched to the actual scaling factor. Thus, the bandwidth of the frequency representation of the actual digitized video signal is more appropriately limited to prevent overlap with its spectral replica, which reduces aliasing in the scaled video image.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is a conceptual diagram of a look-up table configured to store sets of multi-tap filter coefficients based on input resolutions and output resolutions, according to one embodiment of the invention.

DETAILED DESCRIPTION

Figure 2:
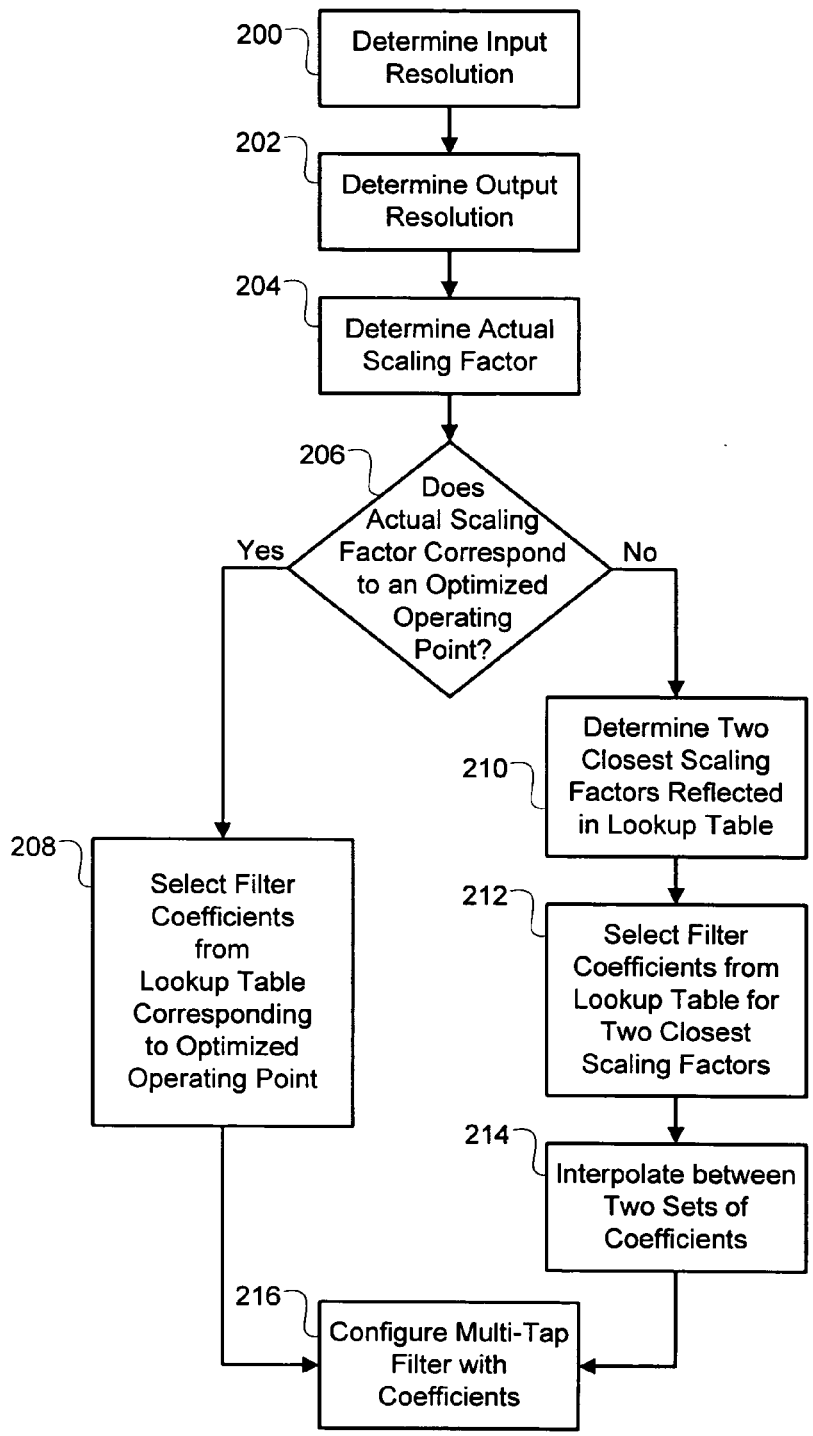
FIG. 2 presents a flowchart of method steps for determining a set of coefficients for a multi-tap filter, according to one embodiment of the invention.

FIG. 1 is a conceptual diagram of a look-up table 100 configured to store sets of multi-tap filter coefficients based on input resolutions and output resolutions, according to one embodiment of the invention. As shown, the look-up table 100 is a matrix organized into n rows and m columns. Each row corresponds to a different standardized video source resolution. For example, a row 102 may correspond to a resolution of 720 pixels×480 lines, which is the NTSC video standard. Likewise, a row 104 may correspond to a resolution of 720 pixels×576 lines, which is the PAL video standard, and a row 106 may correspond to a resolution of 1280 pixels×720 lines, which is the 720P high-definition video standard. Video processors typically are configured to receive and process input signals having these standardized resolutions. In one embodiment, the rows of the look-up table 100 are arranged from top to bottom in order of lowest resolution to highest resolution. In alternative embodiments, the rows of the look-up table 100 may be arranged in any other technically feasible fashion that does not inhibit the implementation of the invention.

Each column corresponds to a different standardized video display resolution. For example, a column 108 may correspond to a resolution of 1024 pixels×768 lines, which is the XGA display standard. Similarly, a column 110 may correspond to a resolution of 1280 pixels×1024 lines, which is the SXGA display standard, and a column 112 may correspond to a resolution of 1600 pixels×1200 lines, which is the UXGA display standard. Again, video processors typically are configured to produce output signals having these standardized resolutions. In one embodiment, the columns of the look-up table 100 are arranged from left to right in order of lowest resolution to highest resolution. In alternative embodiments, the columns of the look-up table 100 may be arranged in any other technically feasible fashion that does not inhibit the implementation of the invention.

Each cell of the look-up table 100 contains a set of filter coefficients optimized for the scaling factor represented by the ratio of the standardized video display (output) resolution associated with the cell to the standardized video source (input) resolution associated with the cell. Each such intersection is referred to as an "optimized operating point." Further, in one embodiment, the filter coefficients in each cell include separate sets of horizontal and vertical filter coefficients.

In one embodiment, the look-up table 100 accounts for four standardized video source (input) resolutions and ten standardized video display (output) resolutions, resulting in forty optimized operating points. Thus, the look-up table 100 includes forty sets of optimized filter coefficients. In alternative embodiments, the look-up table 100 may include fewer or greater than forty optimized sets of filter coefficients. In one embodiment, the sets of optimized filter coefficients are configured for an 8×8 tap filter. In alternative embodiments, the sets of optimized filter coefficients may be configured for any size multi-tap filter.

FIG. 2 presents a flowchart of method steps for determining a set of coefficients for a multi-tap filter, according to one embodiment of the invention. Persons skilled in the art will recognize that any system configured to perform the method steps in any order is within the scope of the invention.

As shown, the method for determining the set of coefficients begins in step 200, where a device driver communicates with a video processor to determine the resolution of the video signal input into the video processor. In step 202, the device driver communicates with the video processor to determine the resolution of the video signal output from the video processor. In step 204, the device driver determines the scaling factor being implemented by the video processor (i.e., the "actual scaling factor") by computing the ratio of the output signal resolution to the input signal resolution.

In step 206, the device driver determines whether the actual scaling factor corresponds to one of the optimized operating points reflected in the look-up table 100. If the scaling factor does not correspond to the one of the optimized operating points, then the method proceeds to step 210, where the device driver determines which two scaling factors reflected in the look-up table 100 are closest to the actual scaling factor (one scaling factor being relatively smaller than the actual scaling factor and one scaling factor being relatively larger than the actual scaling factor). If the resolution of the video processor input signal matches one of the standardized video source resolutions included in the look-up table 100, then the device driver identifies the two standardized video display resolutions included in the look-up table 100 that are closest to the resolution of the video processor output signal. The two closest scaling factors, then, are simply (i) the ratio of the first closest standardized video display resolution to the standardized video source resolution (that, in this case, matches the resolution of the video processor input signal) and (ii) the ratio of the second closest standardized video display resolution to the standardized video source resolution.

If the resolution of the video processor input signal does not match one of the standardized video source resolutions included in the look-up table 100, then the device driver first determines which standardized video source resolution included in the look-up table 100 is closest to the resolution of the video processor input signal. The device driver then follows the process described above to determine the two scaling factors reflected in the look-up table 100 that are closest to the actual scaling factor, using this closest standardized video source resolution in lieu of the resolution of the video processor input signal.

In step 212, the device driver selects the two sets of filter coefficients from the look-up table 100 corresponding to the two scaling factors determined to be closest to the actual scaling factor. In step 214, the device driver performs a linear interpolation on the two sets of selected filter coefficients to generate a single set of interpolated filter coefficients. In alternative embodiments, other schemes may be used to generate a single set of filter coefficients from the two selected sets of filter coefficients. The method concludes in step 216, where the device driver configures the multi-tap filter residing in the video processor with the set of interpolated filter coefficients.

Referring back now to step 206, if the actual scaling factor corresponds to one of the optimized operating points reflected in the look-up table 100, then the method proceeds to step 208. In step 208, the device driver selects the set of filter coefficients from the look-up table 100 corresponding to the optimized operating point. The method then proceeds to step 216, where the device driver configures the multi-tap filter with the set of selected coefficients.

One advantage of the disclosed adaptive scaling technique is that upscaling and downscaling operations are performed using filter coefficients that are either optimized for that specific scaling operation or interpolated from coefficients that are optimized for two similar scaling operations. For most operations, the multi-tap filter operates within a reasonable range of the optimized operating points reflected in the look-up table 100. Thus, the adaptive scaling technique provides more precise filtering relative to prior art designs, resulting in higher-quality scaled video images with less fuzziness and distortion. Further, when downscaling, the disclosed technique implements a set of filter coefficients that provides a cutoff frequency more closely matched to the actual scaling factor. Thus, the bandwidth of the frequency representation of the actual digitized video signal is more appropriately limited to prevent overlap with its spectral replica, which reduces aliasing in the scaled video image.

Figure 3:
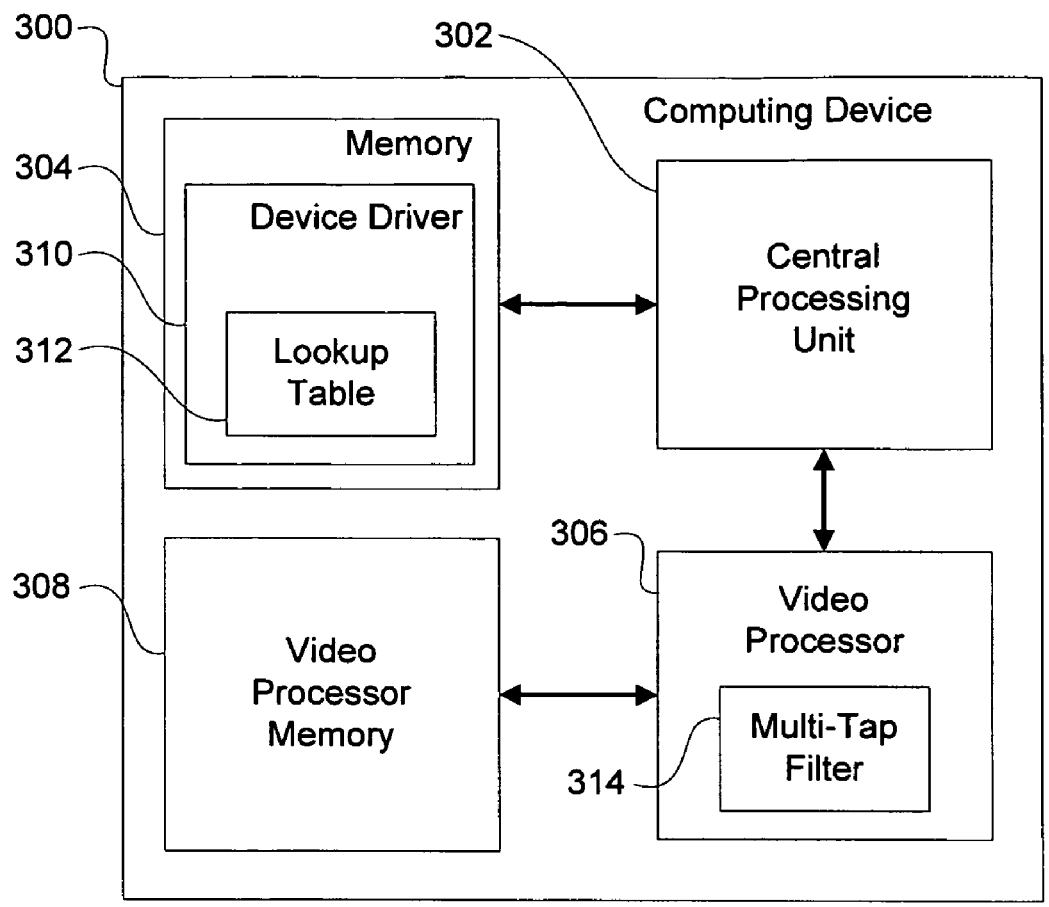
FIG. 3 is a conceptual diagram of a computing device that may be configured to implement one or more aspects of the invention.

FIG. 3 is a conceptual diagram of a computing device 300 that may be configured to implement one or more aspects of the present invention. The computing device 300 includes, without limitation, a central processing unit 302, a memory 304 coupled to the central processing unit 304, a video processor 306 coupled to the central processing unit 302, and a video processor memory 308 coupled to the video processor 306. The computing device 300 may be a desktop computer, server, laptop computer, palm-sized computer, personal digital assistant, tablet computer, game console, cellular telephone, a television, a display device, such as a monitor or video projector, or any other type of similar device that processes video image data. The memory 304 includes a device driver 310, which includes a look-up table 312. The video processor 306 includes the multi-tap filter 314, which the device driver 310 can adaptively configure with different sets of coefficients in the manner described herein as operating conditions change.

While the foregoing is directed to embodiments of the present invention, other and further embodiments of the invention may be devised without departing from the basic scope thereof, and the scope thereof is determined by the claims that follow.

We claim:

1. A computer-implemented method for adaptively configuring a multi-tap video filter included in a video processor to filter an input video image received by the video processor to generate an output video image, the method comprising:
   determining a video input signal resolution associated with the input video image;
   determining a video output signal resolution associated with the output video image;
   determining an actual scaling factor by computing a ratio between the video input signal resolution and the video output signal resolution;
   determining that the actual scaling factor does not correspond to any optimized operating points included in a look-up table stored in a memory, wherein each optimized operating point included in the look-up table corresponds to a different scaling factor and is associated with a different set of filter coefficients;
   determining a first scaling factor and a second scaling factor that are closest to the actual scaling factor, wherein the first scaling factor corresponds to a first optimized operating point and the second scaling factor corresponds to a second optimized operating point;
   selecting a first set of filter coefficients associated with the first optimized operating point and a second set of filter coefficients associated with the second optimized operating point from the look-up table;
   interpolating between the first set of filter coefficients and the second set of filter coefficients to generate a set of interpolated filter coefficients;
   configuring the multi-tap video filter based on the set of interpolated filter coefficients;
   filtering the input video image to generate the output video image; and
   storing the output video image in a video processor memory coupled to the video processor and/or displaying the output video image on a display device.

2. The computer-implemented method of claim 1, wherein the look-up table is a matrix, and standardized video source resolutions are represented along one dimension of the matrix and standardized video display resolutions are represented along another dimension of the matrix.

3. The computer-implemented method of claim 2, wherein each cell of the look-up table contains a set of filter coefficients optimized for an operating point defined by a scaling factor represented by a ratio of a standardized video display resolution associated with the cell to a standardized video source resolution associated with the cell.

4. The computer-implemented method of claim 1, wherein the actual scaling factor is between the first scaling factor and the second scaling factor.

5. A computer-readable medium storing instructions for causing a computer to adaptively configure a multi-tap video filter included in a video processor to filter an input video image received by the video processor to generate an output video image, by performing the steps of:
   determining a video input signal resolution associated with the input video image;
   determining a video output signal resolution associated with the output video image;
   determining an actual scaling factor by computing a ratio between the video input signal resolution and the video output signal resolution;
   determining that the actual scaling factor does not correspond to any optimized operating points included in a look-up table stored in a memory, wherein each optimized operating point included in the look-up table corresponds to a different scaling factor and is associated with a different set of filter coefficients;
   determining a first scaling factor and a second scaling factor that are closest to the actual scaling factor, wherein the first scaling factor corresponds to a first optimized operating point and the second scaling factor corresponds to a second optimized operating point;
   selecting a first set of filter coefficients associated with the first optimized operating point and a second set of filter coefficients associated with the second optimized operating point from the look-up table;
   interpolating between the first set of filter coefficients and the second set of coefficients to generate a set of interpolated filter coefficients;
   configuring the multi-tap video filter based on the set of interpolated filter coefficients to filter the input video image; and
   filtering the input video image to generate a filtered output video image for storage in a memory and/or display on a display device.

6. The computer-readable medium of claim 5, wherein the look-up table is a matrix, and standardized video source resolutions are represented along one dimension of the matrix and standardized video display resolutions are represented along another dimension of the matrix.

7. The computer-readable medium of claim 6, wherein each cell of the look-up table contains a set of filter coefficients optimized for an operating point defined by a scaling factor represented by a ratio of a standardized video display resolution associated with the cell to a standardized video source resolution associated with the cell.

8. The computer-readable medium of claim 5, wherein the actual scaling factor is between the first scaling factor and the second scaling factor.

9. A computing device configured with an adaptive multi-tap filter to filter an input video image to generate an output video image, the computing device comprising:
- a video processor that includes the adaptive multi-tap filter; and
- a device driver that includes a look-up table of filter coefficients and configured to perform the steps of:
  - determining a video input signal resolution associated with the input video image,
  - determining a video output signal resolution associated with the output video image,
  - determining an actual scaling factor by computing a ratio of the video input signal resolution and the video output signal,
  - determining that the actual scaling factor does not correspond to any optimized operating points included in the look-up table, wherein each optimized operating point included in the look-up table corresponds to a different scaling factor and is associated with a different set of filter coefficients,
  - determining a first scaling factor and a second scaling factor that are closest to the actual scaling factor, wherein the first scaling factor corresponds to a first optimized operating point and the second scaling factor corresponds to a second optimized operating point,
  - selecting a first set of filter coefficients associated with the first optimized operating point and a second set of filter coefficients associated with the second optimized operating point from the look-up table,
  - interpolating between the first set of filter coefficients and the second set of coefficients to generate a set of interpolated filter coefficients,
  - configuring the multi-tap video filter based on the set of interpolated filter coefficients to filter the input video image, and
  - filtering the input video image to generate a filtered output video image for storage and/or display.

10. The computing device of claim 9, wherein the look-up table is a matrix, and standardized video source resolutions are represented along one dimension of the matrix and standardized video display resolutions are represented along another dimension of the matrix.

11. The computing device of claim 10, wherein each cell of the look-up table contains a set of filter coefficients optimized for an operating point defined by a scaling factor represented by a ratio of a standardized video display resolution associated with the cell to a standardized video source resolution associated with the cell.

12. The computing device of claim 9, wherein the actual scaling factor is between the first scaling factor and the second scaling factor.

* * * * *

UNITED STATES PATENT AND TRADEMARK OFFICE
CERTIFICATE OF CORRECTION

PATENT NO. : 7,619,639 B1
APPLICATION NO. : 11/224892
DATED : November 17, 2009
INVENTOR(S) : Azar et al.

Page 1 of 1

It is certified that error appears in the above-identified patent and that said Letters Patent is hereby corrected as shown below:

In column 7, line 25, please replace "output signal," with -- output signal resolution, --.

Signed and Sealed this

Twenty-third Day of February, 2010

David J. Kappos
*Director of the United States Patent and Trademark Office*